(12) United States Patent
Kelkar et al.

(10) Patent No.: US 7,536,373 B2
(45) Date of Patent: May 19, 2009

(54) RESOURCE ALLOCATION USING RELATIONAL FUZZY MODELING

(75) Inventors: Bhooshan P. Kelkar, Plano, TX (US); Sanjay D. Bhat, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 192 days.

(21) Appl. No.: 11/353,385

(22) Filed: Feb. 14, 2006

(65) Prior Publication Data

US 2007/0192261 A1     Aug. 16, 2007

(51) Int. Cl.
G06F 9/44         (2006.01)
G06N 7/06         (2006.01)
G06N 7/02         (2006.01)
(52) U.S. Cl. .................................... 706/52; 706/908
(58) Field of Classification Search .................... 706/52
See application file for complete search history.

(56) References Cited

U.S. PATENT DOCUMENTS

| | | | |
|---|---|---|---|
| 6,112,301 | A | 8/2000 | Johnson |
| 6,701,312 | B2 | 3/2004 | Lau et al. |
| 2003/0037063 | A1* | 2/2003 | Schwartz ................. 707/104.1 |
| 2003/0126260 | A1* | 7/2003 | Husain et al. ............... 709/225 |
| 2004/0213257 | A1* | 10/2004 | Abdelilah et al. ........ 370/395.1 |

FOREIGN PATENT DOCUMENTS

WO    WO 02/059807 A2    8/2002

OTHER PUBLICATIONS

Browning, L., "IBM eserver p5 AIX 5L Suppport for Micro-Partitioning and Simultaneous Multi-threading," IBM White Paper, Jul. 13, 2004.
Pertselakis, M. et al., "An Adaptive Resource Allocating Neural Fuzzy Inference System," source and date unknown.
Gomez, F.J. et al., "A Neuroevolution Method for Dynamic Resource Allocation on a Chip Multiprocessor," Proceedings of the International Joint Conference on Neural Networks, 2001.

(Continued)

*Primary Examiner*—David R Vincent
*Assistant Examiner*—Ben M Rifkin
(74) *Attorney, Agent, or Firm*—Norman Gundel; Hoffman Warnick LLC

(57) ABSTRACT

A system and method for allocating computing resources among a plurality of units in a distributed network. A system is provided that includes: a relational fuzzy modeling system for providing a relational fuzzy model based on historical resource parameter data and historical system parameter data, and for predicting and allocating resource requirements for each unit based on the relational fuzzy model; a normalization system for ensuring that a sum of the predicted resource requirements is no more than a total available amount of actual resources available on the plurality of units; and an extra resource allocation system for allocating extra resources when the sum of the predicted resource requirements is less than the total available amount of resources available on the plurality of units.

19 Claims, 2 Drawing Sheets

OTHER PUBLICATIONS

Song, S. et al., "Fuzzy Trust Integration for Security Enforcement in Grid Computing," International Symposium on Network and Parallel Computing (NPC 2004), Mar. 22, 2004.

Funk, M., "Simultaneous Multi-Threading (SMT) on eServer iSeries POWER5 Processors," May 2004.

Author unknown, "Dynamic Logical Partitioning," http://www-03.ibm.com/servers/eserver/iseries/lpar/systemdesign.html, printed on Oct. 10, 2005.

Author unknown, "Application Performance Evaluator and Resource Allocation Tool," http://alphaworks.ibm.com/tech/apera, posted May 5, 2003, printed on Oct. 10, 2005.

Liu, C. et al., "Model-Driven Resource Management for Distributed Real-Time and Embedded Systems," source and date unknown.

Chandra, A., "Resource Allocation for Self-Managing Server Systems," Research Statement, source and date unknown.

Author unknown, "Performance, Energy, and Thermal Considerations for SMT and CMP Architectures," source and date unknown.

Author unknown, "CPU Resource Distribution by POWER Hypervisor and Partition Load Manager," IBM Redbooks Technote, http://publib-b.boulder.ibm.com/abstracts/tips 0427.html?Open, printed on Oct. 10, 2005.

* cited by examiner

RESOURCE ALLOCATION USING RELATIONAL FUZZY MODELING

FIELD OF THE INVENTION

The invention relates generally to the allocation of computer resources, and more specifically relates to a system and method of using relational fuzzy modeling to perform resource allocation in a distributed computational environment.

BACKGROUND OF THE INVENTION

With the advent of networks such as the Internet, distributed computing has become an increasingly popular computing approach as it allows for the sharing of computational resources (e.g., memory, processing time, input/output, etc.) among many different users or systems. One such example is "grid computing" (or the use of a computational grid), which involves applying the resources of many computers in a network to a single problem at the same time—usually to a scientific or technical problem that requires a great number of computer processing cycles or access to large amounts of data. In other cases, resources are shared to perform relatively disparate functions. For instance, because of the different time zones involved, remotely located divisions of a corporation might share a high end server capable of performing complex computations. Regardless of the environment, the demand for the available resources in the distributed environment must be carefully allocated.

Moreover, with the advent of new distributed computing technologies, such as IBM's POWER5™ processor, "simultaneous multithreading" is provided in which multiple threads of execution can execute on the same processor at the same time. Using this particular processor, the operating system's task dispatcher "sees" four available processors onto which a task may be dispatched, namely, two physical processors, then because of the multithreading capabilities, two logical processors per physical processor. Given these capabilities, there again exists a need for a robust solution that is capable of optimally allocated resources in a dynamic fashion.

Existing solutions for allocating resources in a distributed computing environment involve: (1) domain knowledge/expert based systems; (2) statistics based systems; and (3) machine learning models, such as neural networks. Unfortunately, each of these approaches has drawbacks. For instance, domain knowledge based or expert systems based tools and methodologies are only as good as the experts themselves. That introduces an element of subjectivity and non-standardization. This can result in variances in performance and a lack of rigor that can lead to sub-optimality of the resource allocation.

Statistics based systems begin with a statistics model, e.g., regression analysis using linear equation, or a cubic spline. Again, this has some inherent assumptions about the data dynamics, which is driven by the expertise of the end user rather than the proactive data exploration. This may lead to sub-optimal system configuration and parameter settings hampering the performance of the resultant configuration.

Machine learning model based approaches, such as neural networks, are uselful tools that can deal with a lot of data at the same time, are scalable and fast learners. However, the interpretation of the neural networks is not so easy for a user, and hence this method is not suitable for verification of "rules" from a validation standpoint.

There are other methods such as fuzzy rule-based modeling, which come close to exploiting non-linearity in the system, however the rule base is a fuzzy logic based representation of expert knowledge that renders itself vulnerable to the same type of issues and drawbacks such as those described above.

Accordingly, a need exists for a robust solution for allocating resources in a distributed computing environment that is not subject to the limitations described above.

SUMMARY OF THE INVENTION

The present invention addresses the above-mentioned problems, as well as others, by providing a resource allocation system and method that uses relational fuzzy modeling to predict resource requirements based on historical resource and system usage data.

In a first aspect, the invention provides a system for allocating computing resources among a plurality of units, comprising: a relational fuzzy modeling system for providing a relational fuzzy model based on historical resource parameter data and historical system parameter data, and for predicting and allocating resource requirements for each unit based on the relational fuzzy model; a normalization system for ensuring that a sum of the predicted resource requirements is no more than a total available amount of actual resources available on the plurality of units; and an extra resource allocation system for allocating extra resources when the sum of the predicted resource requirements is less than the total available amount of resources available on the plurality of units.

In a second aspect, the invention provides a computer program product stored on a computer usable medium for allocating computing resources among a plurality of units, comprising: program code configured for providing a relational fuzzy model based on historical usage data collected from the units; program code configured for predicting and allocating resource requirements for each unit based on the relational fuzzy model; program code configured for ensuring that a sum of the predicted resource requirements is no more than a total available amount of actual resources available on the plurality of units; and program code configured for allocating extra resources when the sum of the predicted resource requirements is less than the total available amount of resources available on the plurality of units.

In a third aspect, the invention provides a method of allocating computing resources among a plurality of units, comprising: generating a relational fuzzy model based on historical usage data collected from each of the units; predicting and allocating resource requirements for each unit based on the relational fuzzy model; ensuring that a sum of the predicted resource requirements is no more than a total available amount of actual resources available on the plurality of units; and allocating extra resources when the sum of the predicted resource requirements is less than the total available amount of resources available on the plurality of units.

In a fourth aspect, the invention provides a method for deploying an application for allocating resources to a set of units in a distributed network, comprising: providing a computer infrastructure being operable to: generate a relational fuzzy model based on historical resource parameter data and historical system parameter data collected from each of the units; and predict and allocate resource requirements for each unit based on the relational fuzzy model.

In a fifth aspect, the invention provides computer software embodied on a computer readable medium for implementing a resource allocation system, the computer software comprising instructions to cause a computer to perform the following functions: generate a relational fuzzy model based on historical resource parameter data and historical system parameter data collected from each of the units; and predict and allocate resource requirements for each unit based on the relational fuzzy model.

Advantages of this invention include the fact that relational fuzzy modeling is easy to interpret and hence validation is easier (unlike neural networks) and relational fuzzy modeling is data driven and is not subjective (unlike expert systems or domain knowledge based systems). Moreover, since it is data driven, relational fuzzy modeling is scalable (unlike expert systems) and by the very nature of the algorithm disclosed herein, relational fuzzy modeling is noise resistant (unlike some statistical methods). Furthermore, due to its data driven nature, relational fuzzy modeling does not assume any preconceived model for the forecasting, nor does it expect input in terms of data regression (unlike most statistical models). Moreover, the disclosed use of weighting factors and confidence values associated with the fuzzy predictions, impart more robustness and objectivity while not compromising flexibility in the utilization of resources.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Figure 1:
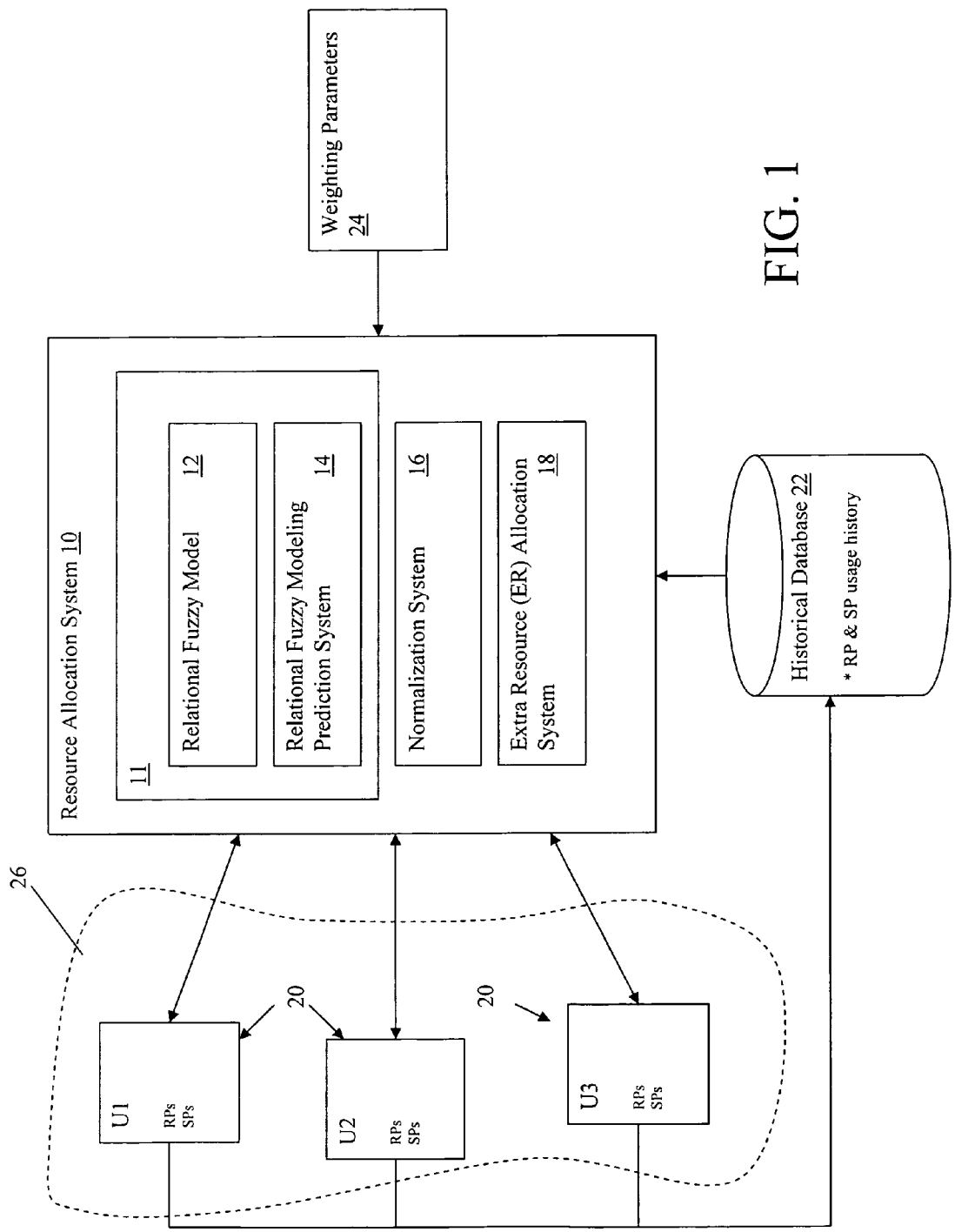
FIG. 1 depicts a resource allocation system in accordance with the present invention.

Referring now to drawings, FIG. 1 depicts a resource allocation system 10 that manages the allocation of resources among a set of units 20 (e.g., U1, U2, U3) contained within a distributed network 26. Units 20 may comprise any type of computing system that includes and/or utilizes resources (e.g., nodes on a grid, logical partitions, servers, personal computers, etc.) Note that for the purposes of this disclosure, the term "distributed network" is not intended to be limiting in any manner, and may range from, e.g., a set of resources scattered about a network, to a set of resources contained within a single piece of hardware.

Resources, which may include any type of computerized asset, e.g., CPU time, memory, I/O, printing, etc., are identified with an associated resource parameter (RP). Thus, the term resource and RP may be utilized interchangeably. In addition, each unit 20 may include a set of system parameters (SPs) that provides various quantified values about each unit 20, such as, but not limited to, descriptors of network speeds, applications running on a unit, quantified mappings of applications and resources, etc., and any combinations thereof. Obviously, the number, type and scale of units 20, RPs, and SPs in the distributed network 26 may vary without departing from the scope of the invention.

Usage history of the RPs and SPs associated with each unit 20 is collected and stored in a historical database 22, which is then used by resource allocation system 10 to predict how to allocate all of the available resources in the most optimal manner. The core technology used by the resource allocation system 10 is a relational fuzzy modeling system 11. Relational fuzzy modeling system 11 includes a relational fuzzy model 12 that is built off of the usage history of the RPs and SPs in the historical database 22. Accordingly, as times goes on, and more and more data is collected, relational fuzzy model 12 becomes more and more robust.

Fuzzy relational systems differ from other fuzzy techniques in that a fuzzy relational model has no explicit set of rules. Instead, a relational array is used that maps every possible logical AND combination of the input reference sets to every output set. For example, consider a system with two inputs RP1, SP1 and a single output:

Output=$f$(RP1, SP1)

If two reference sets, e.g., Low and High, are defined for each input variable, then there are four combinations of input reference sets, and each of these have to be mapped onto each of the similar two output reference sets. Thus, an illustrative relational array will consist of eight elements, such as:

|  | Output set 1 | Output set 2 |
|---|---|---|
| RP1(set a) | 0.2 | 0.5 |
| RP1(set b) | 0.8 | 0 |
| SP1(set a) | 0.2 | 0.1 |
| SP1(set b) | 0.7 | 0.5 |

The content of each element in the relational array is a number between zero and one, which indicates a "confidence value," i.e., how strong the particular relationship linked to that element is. A value of zero indicates that the relationship does not apply, but values greater than zero indicate an increasing strength in the relationship as they approach one. Since every possible relationship between the inputs and outputs is included in the relational array, the values of the relational array elements are what determine how the relational model behaves.

There are several ways of obtaining values for the relational array elements. One is simply to encode a rule-base into a relational format; in the simplest case this means that the array will hold values only of zero and one, since a rule either exists or it does not. Complications can arise with this approach, however, since rule antecedents are usually formulated with more flexibility than the relational model structure allows for.

Identification of the relational array directly from the RP and SP usage data in the historical database 22 is thus preferred, and this is the primary advantage that relational modeling has over its rule-based counterpart. There have been several identification algorithms proposed, but one of the best for noisy systems is that of Ridley, J. N., Shaw, I. S., and Kruger, J. J., "Probabilistic fuzzy model for dynamic systems," Electronic Letters, 24, (1988), pp 890-892, hereinafter "RSK." The RSK algorithm for this identification technique is:

$$R(s1, \ldots, sn, s) = \frac{\sum_{k=1} f_{-}\{s1, \ldots, sn, k\} Y(s)k\}}{\sum_{k=1} f_{-}\{s1, \ldots, sn, k\}}$$

where,
R(s1, . . . , sn, s)=An entry in the relational array
sn=The reference set index for the nth input
s=The reference set index for the output
N=Total number of samples of input-output data
fs1, . . . , sn,=The product of the input possibilities in reference sets
Yk=Possibility vector for the output (at sample k)

One key to the strength of this algorithm in dealing with noisy I/O data is the "f-factor," which gives a measure of the frequency of occurrence of each combination of inputs. The contribution of any particular sample of I/O data is thus weighted according to how frequently, and how strongly, that particular input combination is seen in the data. So, single examples of bad data are unlikely to have a significant effect on the values stored in the relational array.

Once the relational fuzzy model 12 is built, relational fuzzy model prediction system 14 can be utilized to predict RP values for each unit 20 at a given time t. For instance, relational fuzzy model prediction system 14 may determined that for a memory resource $RP_m$ at time t, unit U1 requires X amount of memory, unit U2 requires Y amount of memory, and unit U3 requires Z amount of memory. In other words, at time t, predicted $RP_m(U1)=X$; predicted $RP_m(U2)=Y$; and predicted $RP_m(U3)=Z$.

In general, a relational fuzzy model for predicting any Ui and its $RP_j$ at time t+1 is given by the formula:

$$UiRPj(t+1) = \underset{i=1, j=1}{\overset{i=U, j=J}{R}} (UiRPj(t) \otimes \ldots UiRPj(t - \tau_{rp}) \otimes \ldots UiSPj(t) \otimes UiSPj(t - \tau_{sp}))$$

where
$\otimes$=Fuzzy operator (e.g., min-max; max-max etc.)
$\tau_{rp}$=Time lag element for RP and
$\tau_{sp}$=Time lag element for SP Note that the time lag elements determine how far one needs to go back in the past records for that parameter to make accurate predictions.

Normalization system 16 looks at the predicted amount of resources each unit requires and determines if the total of the sum of the predictions is greater than the total resources available among all of the units 20. In other words, for the above example, a determination is made whether $X+Y+Z>RP_m(available)$? If the sum of the predicted resource requirements is greater than the total available resources, then the predicted RP values are normalized based on the upper limit that is available. Thus, each of RP values is reduced to ensure that their sum is less than the total available resources. Accordingly, in the above example, the predictions are scaled back such that $RP_m(U1)=X'$; $RP_m(U2)=Y'$; and $RP_m(U1)=Z'$. Any method of normalizing the predicted RP values to ensure that the sum does not exceed the upper limit of availability may be utilized.

If, on the other hand, there is a free pool (FP) of resources remaining, then extra resource (ER) allocation system 18 can be utilized to allocate some portion of the free resources to the units 20. This process is accomplished using the weighting parameters 24 provided by a user of each of the units 20 in the distributed network 26, as well as the confidence values assigned to each predicted RP by the relational fuzzy model prediction system 14. Weighting parameters thus determine how the free pool will be distributed amongst available system and resource parameters. Weighting parameters provide a means of being conservative on system resources allocation. This allocation process may be done in any fashion, and an illustrative example is provided below with respect to FIG. 2.

Note that in general, resource allocation system 10 may comprise any type of computing system, and could be implemented as part of a client and/or a server. Such a computing system generally includes a processor, input/output (I/O), memory, and bus. The processor may comprise a single processing unit, or be distributed across one or more processing units in one or more locations, e.g., on a client and server. Memory may comprise any known type of data storage and/or transmission media, including magnetic media, optical media, random access memory (RAM), read-only memory (ROM), a data cache, a data object, etc. Moreover, memory may reside at a single physical location, comprising one or more types of data storage, or be distributed across a plurality of physical systems in various forms.

I/O may comprise any system for exchanging information to/from a unit 20. External devices and resources may also comprise any known type of device, including a monitor/display, speakers, storage, another computer system, a hand-held device, keyboard, mouse, voice recognition system, speech output system, printer, facsimile, pager, etc. Additional components, such as cache memory, communication systems, system software, etc., may be incorporated into the computing system.

Access to resource allocation system 10 may be provided over a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. Further, as indicated above, communication could occur in a client-server or server-server environment.

Historical database 22 may likewise include any type of storage unit, e.g., magnetic, optical, etc., and implemented in any fashion, e.g., as a relational database, flat files, data objects, etc.

Figure 2:
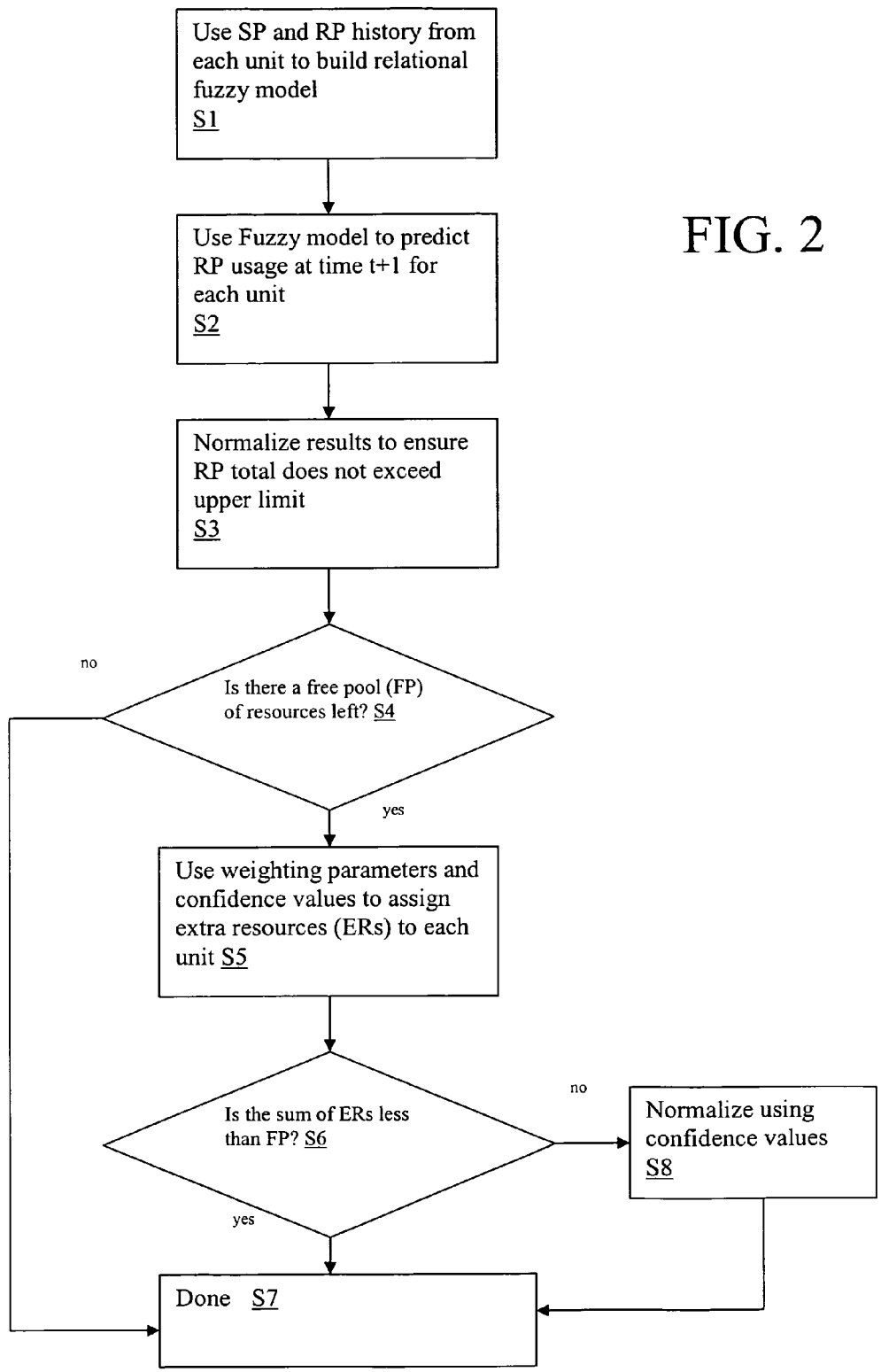
FIG. 2 depicts a method of implementing a resource allocation process in accordance with the present invention.

Referring now to FIG. 2, a flow diagram of an illustrative method of implementing the invention is shown. At step S1, a relational fuzzy model is built and maintained using SP and RP history collected from each unit in the distributed network. At step S2, the relational fuzzy model is utilized to predict RP usage at a time t+1 for each unit. At step S3, the results are normalized (if necessary) to ensure that the sum of the total predicted RPs does not exceed the upper limit of what is available in the network.

At step S4, a determination is made whether there is a free pool (FP) of resources left in the network after all of the RPs have been predicted for time t+1. If there are none, then the process is done (step S7). If there is a free pool, then weighting parameters and confidence values are utilized to assign extra resource (ER) to units in the network at step S5. The weighting parameters are user input and are provided by the users who know the system well (e.g., experts), and the confidence values are produced for each predicted RP by the relational fuzzy modeling system. Note that in one illustrative embodiment, the weighting parameters are inversely proportional to the confidence values for each RP. The higher the confidence value, the lower the weighting parameter. This means that if a confidence value for allocating a free pool fraction to a particular resource is high, i.e., there is more certainty of a predicted value being accurate, the weighting parameter would be smaller compared to other resources, thereby assigning less margin for error. At step S6, if the sum of the ERs is less than the free pool, then the process is done at step S7. If the sum is greater than the free pool, then the ER values are normalized using the confidence values at step S8, and the process completes at step S7.

It should be appreciated that the teachings of the present invention could be offered as a business method on a subscription or fee basis. For example, a computer system comprising a resource allocation system 10 could be created, maintained and/or deployed by a service provider that offers the functions described herein for customers. That is, a service provider could offer to provide a system for allocating resources using relational fuzzy modeling as described above.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part or all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for allocating computing resources among a plurality of units within a computing grid, comprising:
   a processor:
   a computer readable medium accessible by the processor;
   a relational fuzzy modeling system for providing a relational fuzzy model having a relational array that maps a set of resource parameters and a set of system parameters to at least one output set, wherein the relational fuzzy model for predicting a requirement for a resource RPj at a given unit Ui at time t+1, is given by the equation:

$$UiRPj(t+1) = \mathop{R}_{i=1, j=1}^{i=U, j=J} (UiRPj(t) \otimes \ldots UiRPj(t - \tau_{rp}) \otimes \ldots UiSPj(t) \otimes UiSPj(t - \tau_{sp}))$$

where
   R is the relational array,
   $\otimes$ is a fuzzy operator selected from the group consisting of,
   $\tau_{rp}$ is a time lag element for each resource parameter, and
   $\tau_{sp}$ is a time lag element for each system parameter;
      wherein each element in the relational array includes a confidence value that is based on historical resource parameter data and historical system parameter data;
   a normalization system for ensuring that a sum of the predicted resource requirements is no more than a total available amount of actual resources available on the plurality of units;
   a system for outputting an allocation of resources to units within the computing grid based on predicted resource requirements; and
   an extra resource allocation system for allocating extra resources when the sum of the predicted resource requirements is less than the total available amount of resources available on the plurality of units.

2. The system of claim 1, wherein the historical resource parameter data includes data selected from the group consisting of: processor unit usage, memory usage, and input/output usage.

3. The system of claim 1, wherein the historical system parameter data includes data selected from the group consisting of: network speed data, applications running on each unit, and quantified mappings of applications and resources running on each unit.

4. The system of claim 1, wherein each confidence value is calculated from the historical resource parameter data and historical system parameter data using an algorithm given as follows:

$$R(s1, \ldots, sn, s) = \frac{\sum_{k=1} f\_\{s1, \ldots, sn, k\} Y(s)k}{\sum_{k=1} f\_\{s1, \ldots, sn, k\}}$$

where,
   $R(s1, \ldots, sn, s)$ is entry in the relational array,
   sn is a reference set index for the nth input
   s is a reference set index for the output
   $f\{s1, \ldots, sn\}$ is a product of the input possibilities in reference sets
   $Y(s)k$ is a possibility vector for the output at sample s.

5. The system of claim 1, wherein the extra resource allocation system allocates extra resources based on weighting parameters obtained for each unit.

6. The system of claim 5, wherein the extra resource allocation system further allocates extra resources based on confidence values produced by the relational fuzzy modeling system.

7. A computer program product stored on a computer readable medium for allocating computing resources among a plurality of units in a computing grid, comprising:
   program code configured for providing a relational fuzzy model based on historical usage data collected from the units, wherein the relational fuzzy model for predicting a requirement for a resource RPj at a given unit Ui at time t+1, is given by the equation:

$$UiRPj(t+1) = \mathop{R}_{i=1,j=1}^{i=U,j=J}(UiRPj(t) \otimes \ldots UiRPj(t-\tau_{rp}) \otimes \ldots UiSPj(t) \otimes UiSPj(t-\tau_{sp}))$$

where
R is the relational array,
$\otimes$ is a fuzzy operator selected from the group consisting of,
$\tau_{rp}$ is a time lag element for each resource parameter, and
$\tau_{sp}$ is a time lag element for each system parameter;
program code configured for predicting resource requirements for each unit based on confidence values stored within the relational array;
program code configured for ensuring that a sum of the predicted resource requirements is no more than a total available amount of actual resources available on the plurality of units;
program code configured for outputting an allocation of resources to units within the computing grid based on the predicted resource requirements; and
program code configured for allocating extra resources when the sum of the predicted resource requirements is less than the total available amount of resources available on the plurality of units.

8. The computer program product of claim 7, wherein the historical usage data includes resource parameter data and historical system parameter.

9. The computer program product of claim 8, wherein:
the historical resource parameter data includes data selected from the group consisting of: processor unit usage, memory usage, and input/output usage; and
the historical system parameter data includes data selected from the group consisting of: network speed data, applications running on each unit, and quantified mappings of applications and resources running on each unit.

10. The computer program product of claim 7, further comprising program code configured for collecting the historical resource parameter data and historical system parameter data from each unit and storing the data in a historical database.

11. The computer program product of claim 7, wherein the extra resources are allocated based on weighting parameters obtained for each unit.

12. The computer program product of claim 11, wherein the extra resources are further allocated based on confidence values produced by the relational fuzzy model.

13. A method of allocating computing resources among a plurality of units in a computing grid, with steps performed by a computer, comprising:
generating a relational fuzzy model based on historical usage data collected from each of the units, wherein the fuzzy relational model includes a relational array that maps parameters associated with the plurality units to at least one output set, wherein the relational fuzzy model for predicting a requirement for a resource RPj at a given unit Ui at time t+1, is given by the equation:

$$UiRPj(t+1) = \mathop{R}_{i=1,j=1}^{i=U,j=J}(UiRPj(t) \otimes \ldots UiRPj(t-\tau_{rp}) \otimes \ldots UiSPj(t) \otimes UiSPj(t-\tau_{sp}))$$

where
R is the relational array,
$\otimes$ is a fuzzy operator selected from the group consisting of min-max; max-max,
$\tau_{rp}$ is a time lag element for each resource parameter, and
$\tau_{sp}$ is a time lag element for each system parameter;
predicting resource requirements for each unit based on the relational fuzzy model;
ensuring that a sum of the predicted resource requirements is no more than a total available amount of actual resources available on the plurality of units;
allocating resource requirements to units within the computing grid based on the predicted resource requirements;
allocating extra resources when the sum of the predicted resource requirements is less than the total available amount of resources available on the plurality of units; and
outputting an allocation of resources and extra resources.

14. The method of claim 13, wherein the historical usage data comprises resource parameter data and historical system parameter data.

15. The method of claim 13, wherein:
the historical resource parameter data includes data selected from the group consisting of: processor unit usage, memory usage, and input/output usage; and
the historical system parameter data includes data selected from the group consisting of: network speed data, applications running on each unit, and quantified mappings of applications and resources running on each unit.

16. The method of claim 13, further comprising the steps of: collecting the historical resource parameter data and historical system parameter data from each unit and storing the data in a historical database.

17. The method of claim 13, wherein the extra resources are allocated based on weighting parameters obtained for each unit.

18. The method of claim 17, wherein the extra resources are further allocated based on confidence values produced by the relational fuzzy model.

19. A method for deploying an application for allocating resources to a set of units in a distributed network with steps performed by a computer, comprising:
providing a computer infrastructure being operable to:
generate a relational fuzzy model based on historical resource parameter data and historical system parameter data collected from each of the units, wherein the relational fuzzy model includes a relational array, wherein the relational fuzzy model for predicting a requirement for a resource RPj at a given unit Ui at time t+1, is given by the equation:

$$UiRPj(t+1) = \mathop{R}_{i=1,j=1}^{i=U,j=J}(UiRPj(t) \otimes \ldots UiRPj(t-\tau_{rp}) \otimes \ldots UiSPj(t) \otimes UiSPj(t-\tau_{sp}))$$

where
R is the relational array,
$\otimes$ is a fuzzy operator selected from the group consisting of,
$\tau_{rp}$ is a time lag element for each resource parameter, and
$\tau_{sp}$ is a time lag element for each system parameter; and
predict and allocate resource requirements for each unit based on the relational fuzzy model.

* * * * *